(12) United States Patent
Kaulic et al.

(10) Patent No.: US 12,003,859 B2
(45) Date of Patent: Jun. 4, 2024

(54) BRIGHTNESS ADJUSTMENT METHOD, AND APPARATUS THEREOF

(71) Applicant: Samsung Electronics Co., Ltd., Suwon-si (KR)

(72) Inventors: Sawan Dineshbhai Kaulic, Noida (IN); Sai Teja Kancharlapalli, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 17/953,857

(22) Filed: Sep. 27, 2022

(65) Prior Publication Data
US 2023/0016564 A1  Jan. 19, 2023

Related U.S. Application Data

(63) Continuation of application No. PCT/KR2022/010373, filed on Jul. 15, 2022.

(30) Foreign Application Priority Data

Jul. 16, 2021  (IN) .............................. 202111032087

(51) Int. Cl.
*H04N 23/70* (2023.01)
*G06T 7/11* (2017.01)
*G06T 7/194* (2017.01)

(52) U.S. Cl.
CPC .............. *H04N 23/70* (2023.01); *G06T 7/11* (2017.01); *G06T 7/194* (2017.01)

(58) Field of Classification Search
CPC ........... H04N 23/70; G06T 7/11; G06T 7/194; G06T 5/94; G06T 2207/10016; G06T 2207/20021; G06T 5/50
See application file for complete search history.

(56) References Cited

U.S. PATENT DOCUMENTS 7,876,978 B2  1/2011  Berger et al.
8,498,498 B2  7/2013  Hwang et al.
8,681,073 B1  3/2014  Robbins et al.
(Continued)

FOREIGN PATENT DOCUMENTS

KR  10-2009-0111939 A  10/2009
KR  10-2010-0036475 A  4/2010
KR  10-2021-0027653 A  12/2021

OTHER PUBLICATIONS

International Search Report dated Oct. 25, 2022, PCT Patent Application No. PCT/KR2022/010373.

*Primary Examiner* — Timothy J Henn
(74) *Attorney, Agent, or Firm* — Jefferson IP Law, LLP

(57) ABSTRACT

A method of adjusting brightness of a foreground video displayed over a background in a user device is provided. The method includes determining enhancement factors for background sections in a background frame of the background, determining an enhancement mask for each foreground sub-frame of the foreground video based on enhancement factor of corresponding background section and determining enhanced brightness values for each foreground pixel in the foreground video based on the enhancement mask. The method of the disclosure provides real-time, clear and distinct viewing of an enhanced foreground video in varying brightness conditions of the background sections.

20 Claims, 14 Drawing Sheets

(56) References Cited

U.S. PATENT DOCUMENTS

| | | | |
|---|---|---|---|
| 9,799,256 B2* | 10/2017 | Yoshiyama | G09G 3/3208 |
| 10,565,962 B2 | 2/2020 | Li | |
| 11,069,104 B1* | 7/2021 | Kuang | H04N 13/279 |
| 11,545,108 B2* | 1/2023 | Hazra | G09G 5/363 |
| 2008/0075384 A1 | 3/2008 | Chung et al. | |
| 2013/0063486 A1 | 3/2013 | Braun et al. | |
| 2013/0147826 A1 | 6/2013 | Lamb | |
| 2014/0253605 A1* | 9/2014 | Border | G09G 5/10 |
| | | | 345/690 |
| 2015/0022542 A1 | 1/2015 | Baba | |
| 2015/0146925 A1 | 5/2015 | Son et al. | |
| 2015/0168720 A1 | 6/2015 | Oh et al. | |
| 2015/0302658 A1* | 10/2015 | O'Connor | G06T 13/80 |
| | | | 345/633 |
| 2017/0243406 A1* | 8/2017 | Yamazaki | G06T 19/20 |
| 2017/0270707 A1* | 9/2017 | Kass | G06T 19/20 |
| 2018/0211635 A1 | 7/2018 | Ishibashi et al. | |
| 2020/0004330 A1 | 1/2020 | Lemoff et al. | |
| 2020/0027201 A1* | 1/2020 | Chen | G06T 7/90 |
| 2020/0186744 A1 | 6/2020 | Wozniak et al. | |
| 2021/0090342 A1* | 3/2021 | Habel | G06T 5/94 |

* cited by examiner

1200B

BRIGHTNESS ADJUSTMENT METHOD, AND APPARATUS THEREOF

CROSS-REFERENCE TO RELATED APPLICATION(S)

This application is a continuation application, claiming priority under § 365(c), of an International application No. PCT/KR2022/010373, filed on Jul. 15, 2022, which is based on and claims the benefit of an Indian patent application number 202111032087, filed on Jul. 16, 2021, in the Indian Intellectual Property Office, the disclosure of which is incorporated by reference herein in its entirety.

TECHNICAL FIELD

The disclosure relates to display devices. More particularly, the disclosure relates to adjusting brightness of videos displayed on the display devices.

BACKGROUND

Augmented Reality (AR) is commonly applied in various consumer electronic devices, for instance, smart glasses, windshields of cars, translucent displays, etc. For AR Devices, the display is mostly a translucent display. Generally, on such AR devices, information pertinent to on-going scene in background is displayed on a display of the AR device. The brightness of the background varies constantly based on ambient lighting conditions. The variations in the brightness of the background affect the displayed information. If the brightness in the background is higher than that of the information, the displayed information is unclear.

One or more objects in the background having brightness contrasting with brightness of the information may adversely affect the brightness of the displayed information. Further, the objects in the background might continuously move, which might affect visibility of one or more sections of the displayed information in different manners in real-time.

Hence, it is necessary to adjust the brightness of the information displayed over the background in the AR devices based on brightness of area in the background, affecting the information.

Therefore, there is a need for an efficient brightness enhancement technique for AR devices.

The above information is presented as background information only to assist with an understanding of the disclosure. No determination has been made, and no assertion is made, as to whether any of the above might be applicable as prior art with regard to the disclosure.

SUMMARY

Aspects of the disclosure are to provide at least the advantages described below. Accordingly, an aspect of the disclosure is to provide a method of adjusting brightness of a foreground video displayed over a background on a display of a user device, the user device configured to adjust brightness of the foreground video displayed over the background on the display, and a video enhancement server in communication with the user device thereof. This summary is neither intended to identify essential features of the disclosure nor is it intended for use in determining or limiting the scope of the disclosure.

Additional aspects will be set forth in part in the description which follows and, in part, will be apparent from the description, or may be learned by practice of the presented embodiments.

In accordance with an aspect of the disclosure, a method of adjusting brightness of a foreground video displayed over a background on a display of a user device is provided. The method includes capturing a background frame of the background by a camera. The method includes dividing the background frame of the background into a plurality of background sub-frames and a foreground video frame of the foreground video into a plurality of foreground sub-frames. The method includes determining an average brightness value of each foreground sub-frame of the plurality of foreground sub-frames and an average brightness value of each background sub-frame of the plurality of background sub-frames. The method includes clustering similar background sub-frames for forming a plurality of background sections. The method includes determining a luminance factor for each background sub-frame of the plurality of background sub-frames. The method includes determining an effective brightness value for each background section of the plurality of background sections based on the luminance factor and the average brightness value of each background sub-frame forming the background section. The method includes determining an enhancement factor for each background section of the plurality of background sections based on the effective brightness value of the background section and an average of the average brightness value of each foreground sub-frame corresponding to each background sub-frame forming the background section. The method includes generating an enhancement mask for each foreground sub-frame of the plurality of foreground sub-frames based on the enhancement factor for the background section corresponding to the foreground sub-frame. The method includes adjusting the average brightness value of each foreground sub-frame of the plurality of foreground sub-frames based on the corresponding enhancement mask for generating an enhanced foreground video frame. The method includes displaying the enhanced foreground video frame over the background on the display of the user device by a display.

In accordance with an aspect of the disclosure, a user device configured to adjust brightness of a foreground video displayed over a background on a display is provided. The user device includes a camera and at least one processor. The camera captures a background frame of the background. The at least one processor is configured to receive and process the foreground video and the background. The at least one processor is configured to divide the background frame of the background into a plurality of background sub-frames and a foreground video frame of the foreground video into a plurality of foreground sub-frames and to determine an average brightness value of each foreground sub-frame of the plurality of foreground sub-frames and an average brightness value of each background sub-frame of the plurality of background sub-frames. The at least one processor is configured to cluster similar background sub-frames to form a plurality of background sections. The at least one processor is configured to determine a luminance factor for each background sub-frame of the plurality of background sub-frames. The at least one processor is configured to determine an effective brightness value for each background section of the plurality of background sections based on the luminance factor and the average brightness value of each background sub-frame forming the background section. The at least one processor is configured to determine an enhancement factor for each background section of the plurality of background sections based on the effective brightness value of the background section and an average of the average brightness value of each foreground sub-frame corresponding to each background sub-frame forming the background section. The at least one processor is configured to generate an enhancement mask for each foreground sub-frame of the plurality of foreground sub-frames based on the enhancement factor for the background section corresponding to the foreground sub-frame. The at least one processor is configured to adjust the average brightness value of each foreground sub-frame of the plurality of foreground sub-frames based on the corresponding enhancement mask to generate an enhanced foreground video frame. The at least one processor is configured to control a display to display the enhanced foreground video frame over the background on the display of the user device.

In accordance with an aspect of the disclosure, a video enhancement server is provided. The video enhancement server is in communication with a user device. The video enhancement server is configured to receive a foreground video and a background from the user device. The video enhancement server includes a memory and at least one processor. The at least one processor is configured to divide a background frame of the background into a plurality of background sub-frames and a foreground video frame of the foreground video into a plurality of foreground sub-frames and to determine an average brightness value of each foreground sub-frame of the plurality of foreground sub-frames and an average brightness value of each background sub-frame of the plurality of background sub-frames. The at least one processor is configured to cluster similar background sub-frames to form a plurality of background sections. The at least one processor is configured to determine a luminance factor for each background sub-frame of the plurality of background sub-frames. The at least one processor is configured to determine an effective brightness value for each background section of the plurality of background sections based on the luminance factor and the average brightness value of each background sub-frame forming the background section. The at least one processor is configured to determine an enhancement factor for each background section of the plurality of background sections based on the effective brightness value of the background section and an average of the average brightness value of each foreground sub-frame corresponding to each background sub-frame forming the background section. The at least one processor is configured to generate an enhancement mask for each foreground sub-frame of the plurality of foreground sub-frames based on the enhancement factor for the background section corresponding to the foreground sub-frame. The at least one processor is configured to adjust the average brightness value of each foreground sub-frame of the plurality of foreground sub-frames based on the corresponding enhancement mask to generate an enhanced foreground video frame.

In an embodiment, the at least one processor identifies the similar background sub-frames based on the average brightness values of the background sub-frames and locations of the background sub-frames within the background frame.

In an embodiment, the at least one processor uses at least one of artificial intelligence based heuristic techniques and deep learning based image segmentation to identify the similar background sub-frames.

In an embodiment, the memory stores the background, the foreground video, and the enhanced foreground video frames.

In an embodiment, the at least one processor determines a dynamic threshold distance for each background sub-frame based on distances of the background sub-frame from nearest and farthest background sub-frames in same background section of the plurality of background sections. The at least one processor determines the luminance factor based on the dynamic threshold distance.

In an embodiment, the at least one processor determines a distance $D_i^F$ between the background sub-frame i and the farthest background sub-frame in the same background section. The at least one processor determines a distance $D_i^C$ between the background sub-frame i and the closest background sub-frame in the same background section. The at least one processor determines the dynamic threshold distance Ti for the background sub-frame. The dynamic threshold distance Ti is an average of the distances $D_i^F$ and $D_i^C$:

$$Ti = \frac{D_i^F + D_i^C}{2},$$

In an embodiment, the at least one processor determines a number of background sub-frames of the same background section within the threshold distance Ti from the background sub-frame i as the luminance factor $w_i$ for the background sub-frame i.

In an embodiment, the effective brightness value for the background section $WC_{section}$ is determined as:

$$WC_{section} = \sum_{i=1}^{n} \frac{x_i * w_i}{w_i} = \frac{x_1 * w_1 + x_2 * w_2 + \ldots + x_n * w_n}{w_1 + w_2 + \ldots + w_n}$$

wherein:
n: total number of background sub-frames in the background section
$x_i$: average brightness value of background sub-frame i
$w_i$: luminance factor of background sub-frame i.

In an embodiment, the enhancement factor for the background section $EF_{section}$ is determined as:

$$EF_{section} = \frac{WC_{section}}{\text{Average of average brightness value of each foreground sub-frame corresponding to each background sub-frame in the background section}}$$

In an embodiment, the at least one processor generates the adjusted brightness value of each foreground sub-frame of the plurality of foreground sub-frames based on the average brightness value of each foreground sub-frame of the plurality of foreground sub-frames and the enhancement factor of the corresponding background section in the enhancement mask for the foreground sub-frame.

In an embodiment, the at least one processor interpolates the adjusted brightness value of each foreground sub-frame of the plurality of foreground sub-frames to obtain interpolated brightness values for each foreground pixel of a plurality of foreground pixels in the foreground sub-frame.

In an embodiment, the at least one processor is configured to adjust a V value of each foreground pixel of the plurality of foreground pixels. The foreground pixel is represented in a Hue-Saturation-Value (HSV) model.

In an embodiment, the user device is an Augmented Reality (AR) device that displays foreground video over the background to a user of the user device.

In an embodiment, the foreground video is translucent.

In an embodiment, the background is a live stream of a user environment obtained by the user device in real-time.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF ACCOMPANYING DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
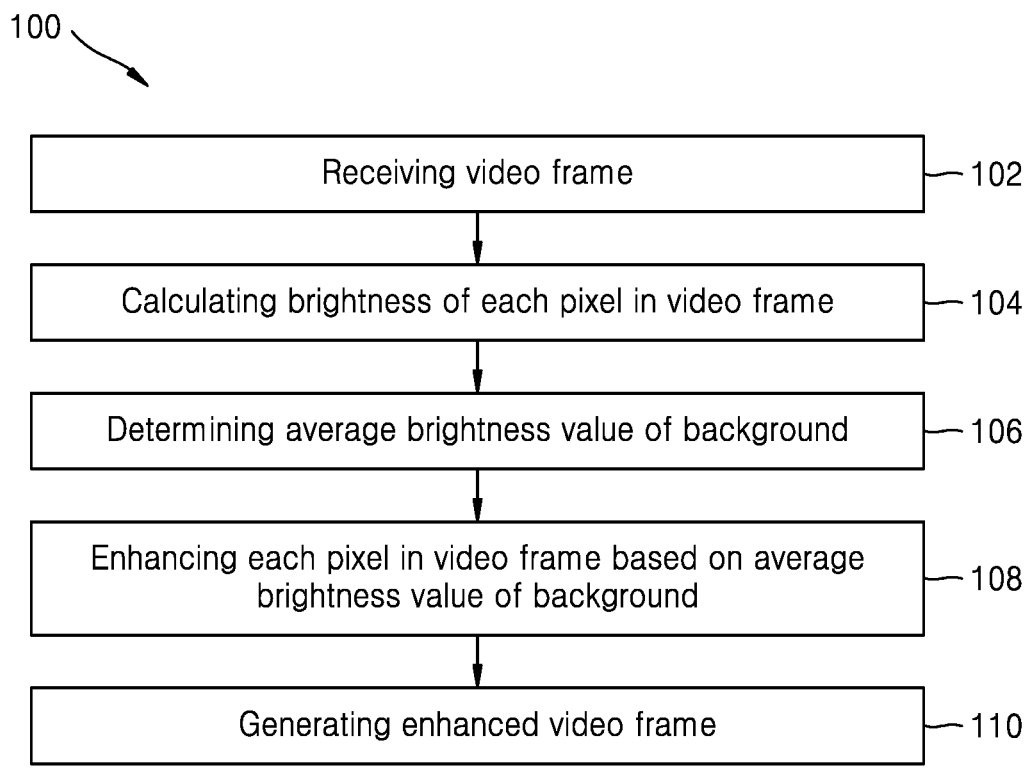
FIG. 1 shows a flowchart illustrating a brightness adjustment method according to the related art.

The embodiments herein provide a method of adjusting brightness of a foreground video displayed over a background on a display of a user device, the user device configured to adjust brightness of the foreground video displayed over the background on the display, and a video enhancement server in communication with the user device thereof.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

One skilled in the art will recognize that implementations or embodiments of the disclosure, some of which are described below, may be incorporated into a number of systems. However, the systems and methods are not limited to the specific embodiments described herein.

Further, structures and devices shown in the figures are illustrative of embodiments of the disclosure and are meant to avoid obscuring of the disclosure.

It should be noted that the description merely illustrates the principles of the disclosure. It will thus be appreciated that those skilled in the art will be able to devise various arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor(s) to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Throughout this application, with respect to all reasonable derivatives of such terms, and unless otherwise specified (and/or unless the particular context clearly dictates otherwise), each usage of "a" or "an" is meant to be read as "at least one" and "the" is meant to be read as "the at least one."

FIG. 1 shows a flowchart illustrating a brightness adjustment method according to the related art.

Referring to FIG. 1, in a brightness adjustment method depicted by a flowchart 100, at operation 102, an AR device receives a video frame to be displayed on a background, according to the related art.

At operation 104, the AR device calculates brightness of each pixel in the video frame.

At operation 106, the AR device determines an average brightness value of the background.

At operation 108, the AR device enhances the pixels in the video frame based on the average brightness value of the background.

At operation 110, the AR device generates an enhanced video frame.

In another method of the related art, pixels in the video frame are changed as per a peak value of background brightness. In another method of the related art, for improving image contrast, brightness of successive video frames are adjusted based on previous video frames. In another method of the related art, to avoid over-increasing of brightness values in a video frame, brightness of all pixels in the video frame is increased and then decreased simultaneously. In yet another method of the related art, the brightness of pixels in the video frame is filtered to bring it in a threshold range.

These techniques suffer from several drawbacks, for instance, in the brightness adjustment techniques of the related art, entirety of the displayed information is dimmed or brightened. In the techniques of the related art, brightness levels in different sections of the video frame in contrast to the background cannot be controlled. In techniques of the related art, filtering of the video frame is done based on a certain threshold value of brightness such that each pixel with brightness greater than threshold is assigned the threshold value. The movement of the objects in the background affects the displayed information due to the brightness changes occurring randomly in real-time. The objects in the background might have different brightness and might be placed at different positions, due to which random sections in the displayed information on the AR device might be affected.

Figure 2:
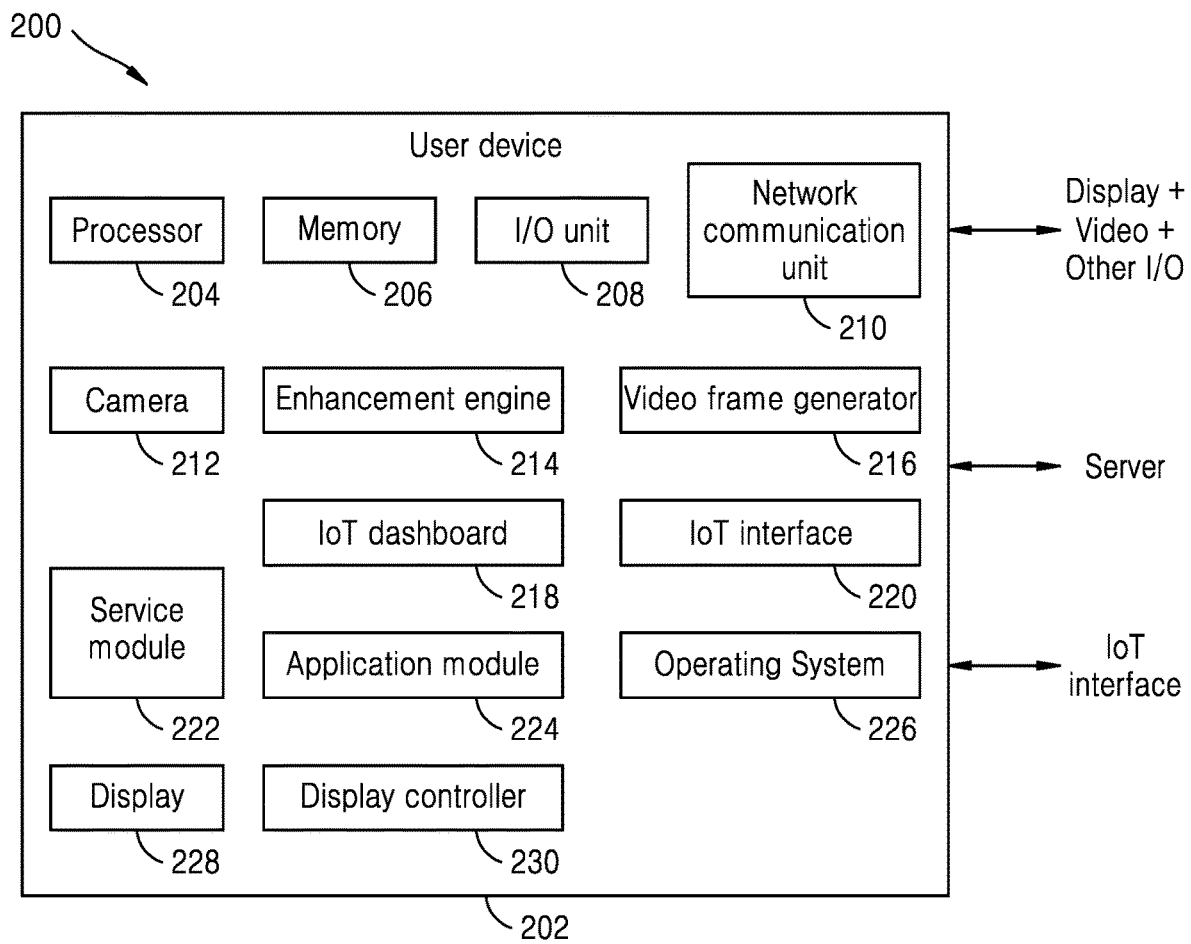
FIG. 2 illustrates a schematic block diagram of a user device according to an embodiment of the disclosure.

FIG. 2 illustrates a schematic block diagram of a user device according to an embodiment of the disclosure.

Referring to FIG. 2, a schematic block diagram 200 of a user device 202 is shown in accordance with an embodiment of the disclosure. The user device 202 includes a processor 204, a memory 206, an Input/Output (I/O) unit 208, a network communication unit 210, a camera 212, an enhancement engine 214, a video frame generator 216, an Internet of Things (IoT) dashboard 218, an IoT interface 220, a service module 222, an application module 224, an Operating System (OS) 226, a display 228, and a display controller 230. The network communication unit 210, the enhancement engine 214, the video frame generator 216, and the display controller 230 may be combined into the processor 204 or the processor 204 may perform the same functions performed by the network communication unit 210, the enhancement engine 214, the video frame generator 216, and the display controller 230.

The processor 204 is configured to perform a brightness adjustment method of the disclosure. The memory 206 is configured to store computer readable instructions, which when executed by the processor 204 cause the processor 204 to perform the brightness adjustment method of the disclosure.

The I/O unit 208 includes one or more I/O devices, such as, but not limited to, a microphone, a touch screen panel, a speaker, etc. The network communication unit 210 establishes and maintains wired/wireless communication with external communication networks or external devices in communication with the user device 202. In an example, the network communication unit 210 includes antennas and/or ports to communicate to wired/wireless communication networks.

Examples of the user device 202 include, but are not limited to, smart glasses, translucent displays, head mounted displays, etc. In an example, the user device 202 may be an Augmented Reality (AR) device.

The camera 212 captures a live stream of a user environment of the user device 202 as a background in real-time. In an example, the user environment is an ambience or an ambient surrounding of the user device 202. For instance, when the user device 202 is smart glasses, the background is a view visible to a user wearing the smart glasses, and when the user device 202 is a windshield of a vehicle, the background is a view visible to a driver of the vehicle.

The enhancement engine 214 receives and processes the background and a foreground video. In an example, the foreground video is a translucent video. For instance, when the user device 202 is the windshield, a navigation route may be displayed over the view of the driver, and when the user device 202 is smart glasses, an incoming call notification may be displayed over the view of the user. Here, the navigation route and the incoming call notification are illustrative translucent foreground videos.

The enhancement engine 214 adjusts a brightness of the foreground video based on a brightness of the background video to generate an enhanced foreground video. The user device 202 displays the enhanced foreground video over the background.

The display controller 230 controls the display 228 to display the enhanced foreground video over the background in real-time. Examples of the display 228 include, but are not limited to, head mounted displays, translucent display panels, etc.

The IoT interface 220 and the IoT dashboard 218 communicate and manage connections of the user device 202 with one or more IoT devices (not shown).

The service module 222 renders one or more services, and the application module 224 executes one or one applications by way of the processor 204. The operating system 226 is executed by the processor 204 after switching ON the user device 202.

The video frame generator 216 receives and processes the foreground video and the background. The video frame generator 216 divides the background into a plurality of background frames. The video frame generator 216 divides the foreground into a plurality of foreground frames. The video frame generator 216 determines various parameters for the foreground video and the background, such as, but not limited to, frame rate (frames per second) and buffer size to determine a number of frames to be provided to the enhancement engine 214 for processing. In an example, the video frame generator 216 provides an optimum number of background frames and foreground video frames to the enhancement engine 214 to ensure smooth transition across the frames.

Figure 3:
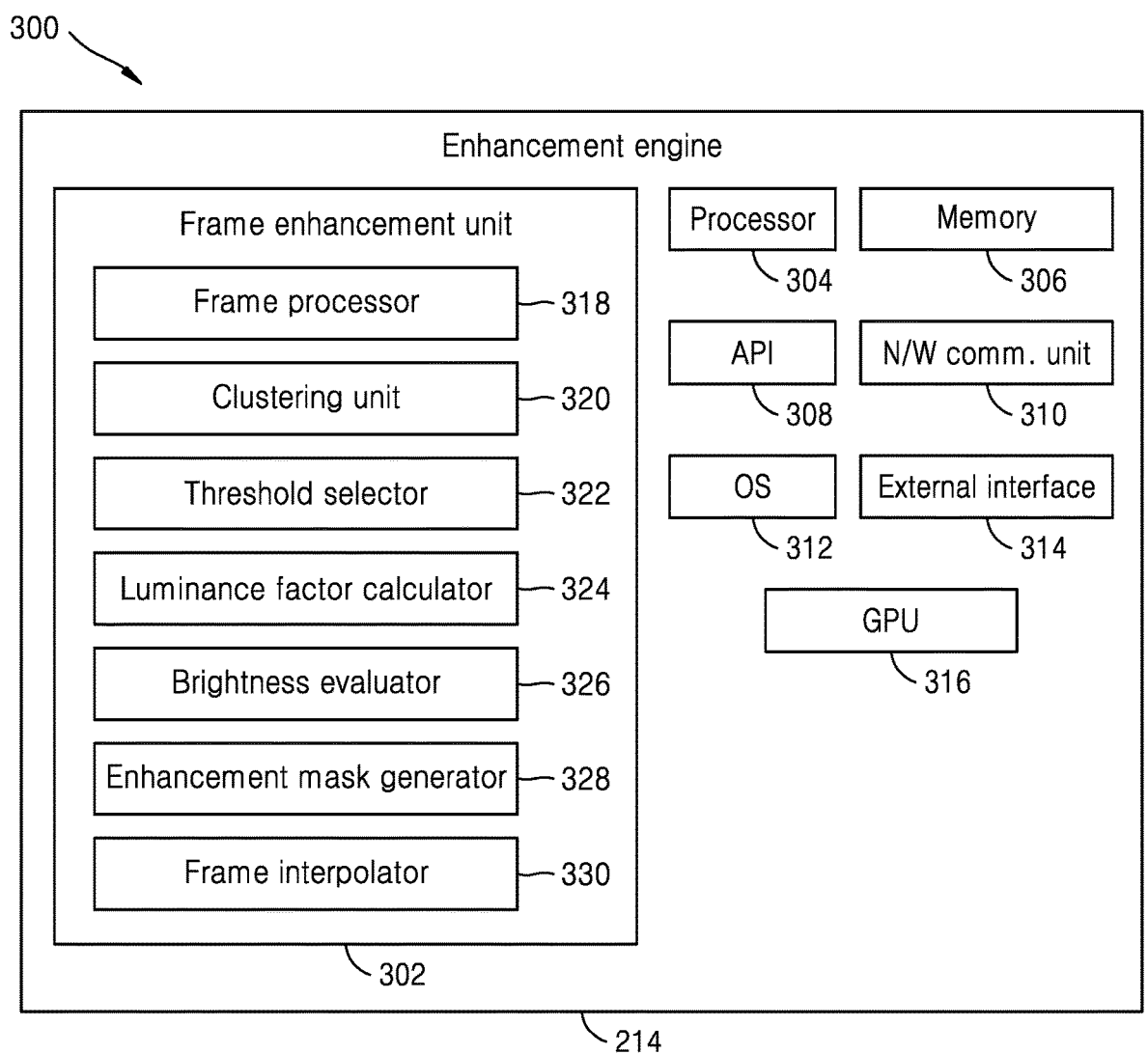
FIG. 3 illustrates a schematic block diagram of an enhancement engine according to an embodiment of the disclosure.

FIG. 3 illustrates a schematic block diagram of an enhancement engine according to an embodiment of the disclosure.

As described above, the enhancement engine 214 may be combined into the processor 204 of the user device 202. Referring to FIG. 3, a schematic block diagram 300 of the enhancement engine 214 is shown in accordance with an embodiment of the disclosure. The enhancement engine 214 includes a frame enhancement unit 302, a processor 304, a memory 306, an Application Programming Interface (API) 308, a network communication unit 310, an OS 312, an external interface 314, and a Graphics Processing Unit (GPU) 316.

The processor 304 is configured to perform the brightness adjustment method of the disclosure. The memory 306 is configured to store computer readable instructions, which when executed by the processor 304 cause the processor 304 to perform the brightness adjustment method of the disclosure. The processor 304 executes the API 308 and the OS 312. The memory 306 is structurally and functionally similar to the memory 206.

The GPU 316 is configured to process the foreground video.

The external interface 314 interfaces the user device 202 with one or more peripheral devices (not shown).

The network communication unit 310 establishes and maintains the wired/wireless communication.

The frame processor 318 receives and processes the foreground video frames and the background frames. The frame processor 318 divides each background frame into a plurality of background sub-frames. the frame processor 318 divides each foreground video frame into a plurality of foreground sub-frames.

The frame processor 318 calculates an average brightness value of each background sub-frame and an average brightness value of each foreground sub-frame.

In an example, the frame processor 318 calculates the average brightness values of the background sub-frames and the average brightness values of the foreground sub-frames as:

$$Bavg = \sqrt{((0.24*(R^2))+(0.691*(G^2))+(0.068*(B^2)))}$$

Here,

Bavg=Average brightness values of a sub-frame

R, G, B are average values of R, G, B channels of pixels in the sub-frame.

The frame processor 318 estimates and proposes a location which is only a part of the background frame where the foreground video frames are superimposed. The frame processor 318 identifies the background sub-frames within the identified part of the background frame. The identified background sub-frames are processed further. The background sub-frames not in the identified part of the background frame are not processed. For instance, when the user device 202 is a smartphone which projects a rectangular screen onto a corresponding rectangular section on the background frame, the enhancement engine 214 receives information of the location of projection through the API 308. The information includes co-ordinates of corners of the rectangular section on the background frame. The frame processor 318 chooses the background sub-frames in the rectangular section for further processing. In case of irregular shape projections, the frame processor 318 expands the shapes by estimating a rectangle that fits the irregular shapes.

The clustering unit 320 identifies regions of similar composition in the background frame in terms of the average brightness value and/or distance(s) between the similar background sub-frames. The clustering unit 320 applies clustering or segmentation techniques using average brightness and position of the background sub-frame in the background frame. The clustering unit 320 uses Artificial Intelligence (AI) based heuristic approaches like clustering techniques (for e.g., K-Means) or deep learning based image segmentation techniques to segment the background frame into visually similar regions of interest to generate background sections. Each background section is represented as a binary mask with corresponding activations only in similar background sections. The clustering unit 320 identifies each background section with similar visual features in terms of brightness.

The threshold selector 322 uses the identified background sections to further evaluate the brightness enhancement required for the foreground video frames with respect to the background frames. The threshold selector 322 determines a dynamic threshold distance for each background sub-frame as an average of closest and farthest similar background sub-frames. The threshold selector 322 determines the dynamic threshold distance Ti as:

$$Ti = \frac{D_i^F + D_i^C}{2}$$

Here:

$D_i^F$ and $D_i^C$ are the distances of the farthest and closest background sub-frames in the same background section as that of the selected $i^{th}$ background sub-frame.

The distance between any two background sub-frames can be calculated using cartesian distance, where a center of the background sub-frame is assigned with $(X_s, Y_s)$ by taking average of pixel locations $(X_p, Y_p)$ with respect to (0,0) at top-left corner of the video frame. For example, for calculating the threshold distance for a background sub-frame 1, which is in section 1, having the farthest background sub-frame 3 in the same section and the closest sub-frame 2 in the same section at distances D2 and D1, respectively, the dynamic threshold distance for the background sub-frame 1 is (D2+D1)/2.

The luminance factor calculator 324 calculates a luminance factor for each background sub-frame. For each background sub-frame SF (I, j) in the background frame, the luminance factor calculator 324 calculates a number of neighboring background sub-frames that belong to the same background section as SF (I, j). The neighboring background sub-frames are the background sub-frames, including the current background sub-frame, of the same background section within the dynamic threshold distance. A total count of such background sub-frames within the dynamic threshold distance is the luminance factor W, of the background sub-frame.

In case of a large background section containing similar background sub-frames very closely, an average brightness of the background section is much more dominant because of cumulative effect of adjacent similar background sub-frames. Here, the enhancement engine 214 chooses the background section directly for brightness enhancement and processes an effective brightness value of the chosen background section.

The brightness evaluator 326 calculates the effective brightness value of the background section using the following expression:

$$WC_{section} = \sum_{i=1}^{n} \frac{x_i * w_i}{w_i} = \frac{x_1 * w_1 + x_2 * w_2 + \ldots + x_n * w_n}{w_1 + w_2 + \ldots + w_n}$$

Here:

n: total number of background sub-frames in the background section $x_i$: average brightness value of background sub-frame i $w_i$: luminance factor of background sub-frame i.

The enhancement mask generator 328 identifies all the foreground sub-frames in the foreground video frame FSF (i, j) corresponding to each background sub-frame BSF (i, j) in each background section in the background frame. The enhancement mask generator 328 calculates an enhancement factor for the background section using the following expression:

$$EF_{section} = \frac{WC_{section}}{\text{Average of average brightness value of each foreground sub-frame corresponding to each background sub-frame in the background section}}$$

After processing all the background sections, the background frame is represented at sub-frame level as an array EF (i, j), where the background sub-frames belonging to the same background section have same EF value. The array is an enhancement mask for enhancing the foreground video frame.

The frame interpolator 330 performs brightness enhancement by obtaining the brightness enhancement at sub-frame level of the foreground video frames, and then obtaining pixel level brightness enhancement for a plurality of foreground pixels in the foreground frames. The frame interpolator 330 calculates the brightness enhancement values of the foreground sub-frames by multiplying the average brightness values of the foreground sub-frames with the enhancement mask. Here, dimensionality and arrangement are common for both the foreground frame and the background frame.

Applying the same enhancement values to all the foreground pixels within the foreground sub-frame is avoided as it might result in abrupt changes in the brightness across the foreground frame and the foreground video might look pixelated and not smooth. Therefore, the frame interpolator 330 performs interpolation to fill intermediate values across width and height dimensions of the foreground frame independently. This ensures smooth transition in the brightness even along boundaries of visually different objects present in a scene.

The display controller 230 increases or adjusts the brightness of the foreground pixels by changing a "V" value of the foreground frame when represented in H (Hue), S (Saturation), V (Value) format, using the enhancement values at the pixel level.

Figure 4:
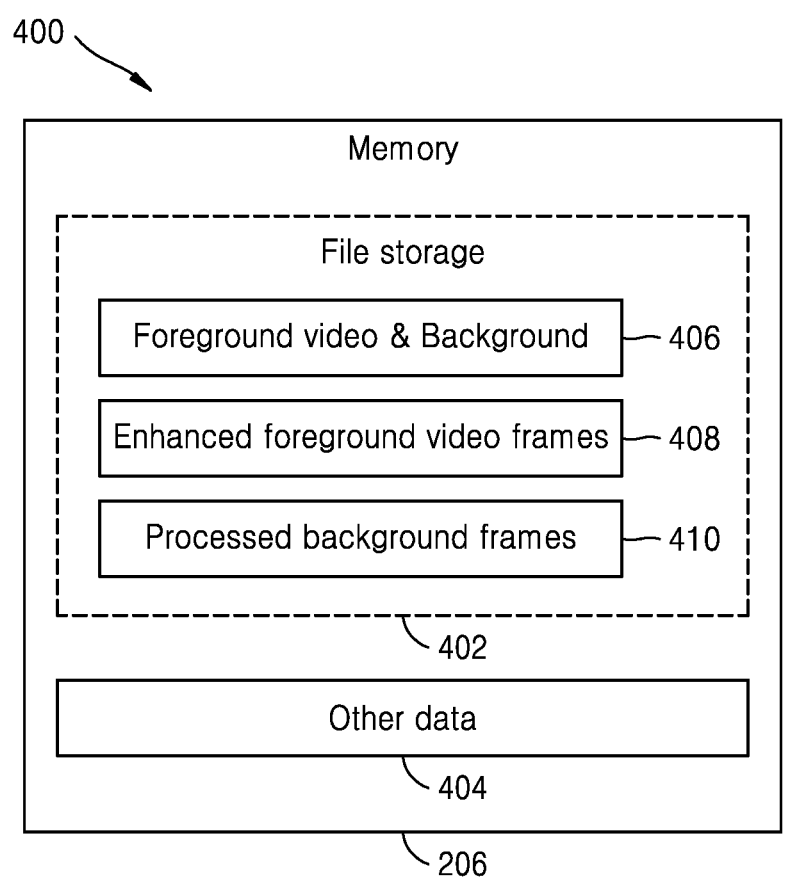
FIG. 4 illustrates a schematic block diagram of a memory according to an embodiment of the disclosure.

FIG. 4 illustrates a schematic block diagram of a memory according to an embodiment of the disclosure.

Referring to FIG. 4, a schematic block diagram 400 of the memory 206 is shown in accordance with an embodiment of the disclosure. The memory 206 includes a file storage 402 and stores other data 404. The file storage 402 includes the foreground video and background 406, the enhanced foreground video frames 408, and the processed background frames 410.

Figure 5:
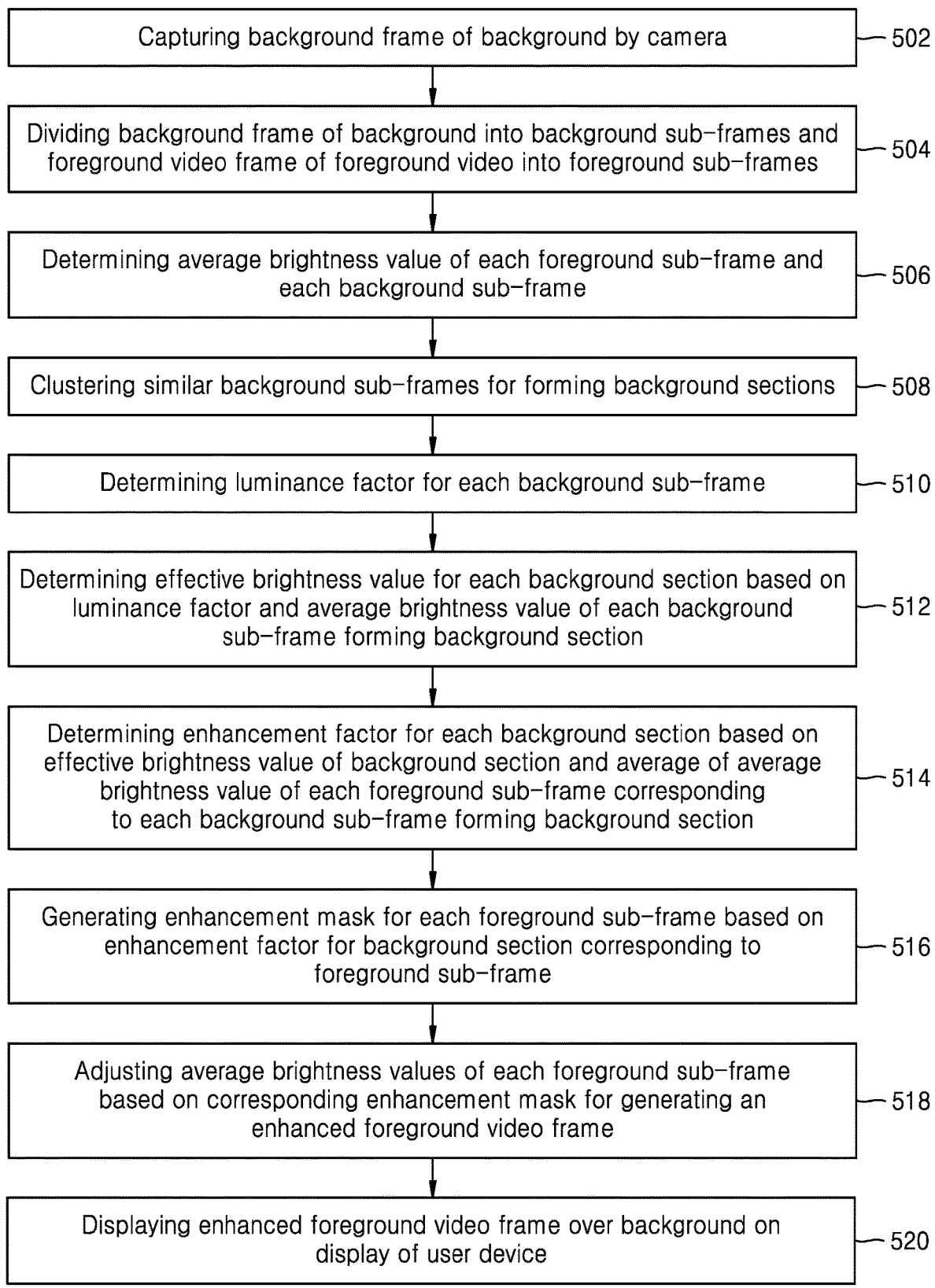
FIG. 5 shows a flowchart illustrating a brightness adjustment method according to an embodiment of the disclosure.

FIG. 5 shows a flowchart illustrating a brightness adjustment method according to an embodiment of the disclosure.

Referring to FIG. 5, a flowchart 500 illustrating the brightness adjustment method is shown in accordance with an embodiment of the disclosure.

At operation 502, the camera 212 captures the background frame of the background.

At operation 504, the frame processor 318 divides the background frame of the background into the background sub-frames and the foreground video frame of the foreground video into the foreground sub-frames.

At operation 506, the frame processor 318 determines the average brightness value of each foreground sub-frame and the average brightness value of each background sub-frame.

At operation 508, the clustering unit 320 clusters the similar background sub-frames for forming the background sections.

The clustering unit 320 identifies the similar background sub-frames based on the average brightness value of each background sub-frame and the locations of the background sub-frames within the background frame.

The clustering unit 320 uses at least one of the AI based heuristic techniques and the deep learning based image segmentation for identifying the similar background sub-frames.

At operation 510, the luminance factor calculator 324 determines the luminance factor for each background sub-frame.

In operation 510, the threshold selector 322 determines the dynamic threshold distance for each background sub-frame based on the distances of the background sub-frame from the nearest and the farthest background sub-frames in the same background section. The luminance factor calculator 324 determines the luminance factor for the background sub-frame based on the dynamic threshold distance.

In determining the dynamic threshold distance, the threshold selector (322) determines the distance $D_i^F$ between the background sub-frame i and the farthest background sub-frame in the same background section. The threshold selector 322 determines the distance $D_i^C$ between the background sub-frame i and the closest background sub-frame in the same background section. The threshold selector 322 determines the dynamic threshold distance Ti for the background sub-frame i. The dynamic threshold distance Ti is an average of the distances $D_i^F$ and $D_i^C$:

$$Ti = \frac{D_i^F + D_i^C}{2};$$

Thereafter, the luminance factor calculator 324 determines a number of background sub-frames of the same background section within the threshold distance Ti from the background sub-frame i as the luminance factor $w_i$ for the background sub-frame i.

At operation 512, the brightness evaluator 326 determines the effective brightness value for each background section based on the luminance factor and the average brightness value of each background sub-frame forming the background section.

At operation 514, the enhancement mask generator 328 determines the enhancement factor for each background section based on the effective brightness value of the background section and the average of the average brightness value of each foreground sub-frame corresponding to each background sub-frame forming the background section.

The effective brightness value for the background section $WC_{section}$ is determined as:

$$WC_{section} = \sum_{i=1}^{n} \frac{x_i * w_i}{w_i} = \frac{x_1 * w_1 + x_2 * w_2 + \ldots + x_n * w_n}{w_1 + w_2 + \ldots + w_n}$$

Here:
n: total number of background sub-frames in the background section
$x_i$: average brightness value of background sub-frame i
$w_i$: luminance factor of background sub-frame i.

At operation 516, the enhancement mask generator 328 generates the enhancement mask for each foreground sub-frame based on the enhancement factor for the background section corresponding to the foreground sub-frame.

The enhancement factor for the background section $EF_{section}$ is determined as:

$$EF_{section} = \frac{WC_{section}}{\text{Average of average brightness value of each foreground sub-frame corresponding to each background sub-frame in the background section}}$$

At operation 518, the frame interpolator 330 adjusts average brightness values of each foreground sub-frame based on the corresponding enhancement mask for generating an enhance foreground video frame. To adjust the average brightness values of each foreground sub-frame, the frame interpolator 330 determines the average brightness value of each foreground sub-frame based on the corresponding enhancement mask for generating the enhanced foreground video frame.

The frame interpolator 330 generates the adjusted brightness values of each foreground sub-frame based on the average brightness value of each foreground sub-frame and the enhancement factor of the corresponding background section in the enhancement mask for the foreground sub-frame.

The frame interpolator 330 interpolates the adjusted brightness value of each foreground sub-frame for obtaining the interpolated brightness values for each foreground pixel in the foreground sub-frame.

The display controller 230 adjusts the V value of each foreground pixel when the foreground pixel is represented in a Hue-Saturation-Value (HSV) model.

At operation 520, the display controller 230 displays the enhanced foreground video frame over the background on the display 228 of the user device 202.

Figure 6:
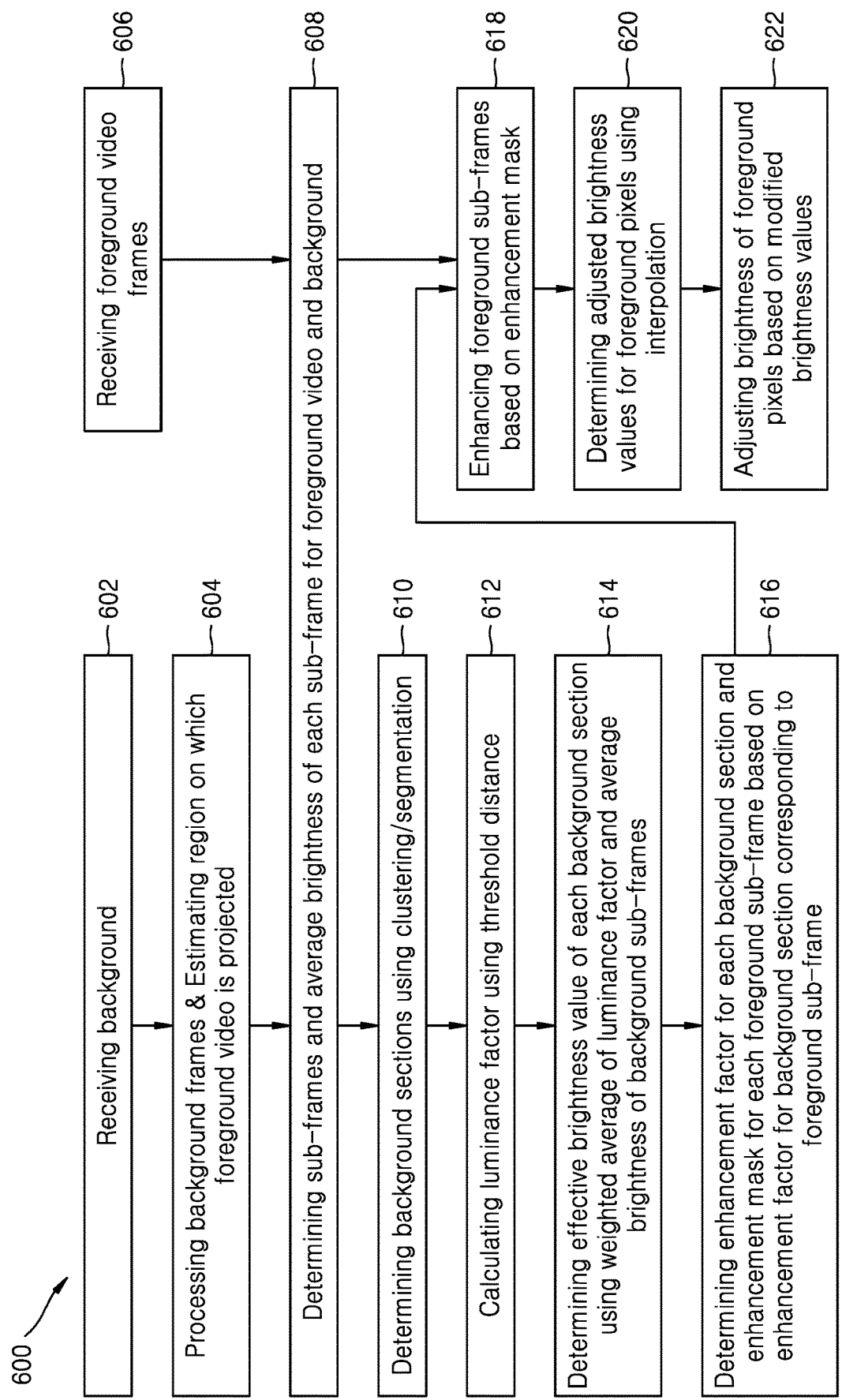
FIG. 6 shows a flowchart illustrating a brightness adjustment method according to an embodiment of the disclosure.

FIG. 6 shows a flowchart illustrating a brightness adjustment method according to an embodiment of the disclosure.

Referring to FIG. 6, a flowchart 600 illustrating the brightness adjustment method is shown in accordance with an embodiment of the disclosure.

At operation 602, the camera 212 provides the background to the enhancement engine 214.

At operation 604, the frame processor 318 processes the background frames and estimates the region on which the foreground video is projected.

At operation 606, enhancement engine 214 receives the foreground frames.

At operation 608, the frame processor 318 generates and determines the background sub-frames and the foreground sub-frames. The frame processor 318 determines the average brightness values of each background sub-frame and each foreground sub-frame.

At operation 610, the clustering unit 320 clusters the similar background sub-frames for forming the background sections.

At operation 612, the threshold selector 322 determines the dynamic threshold distance for each background sub-frame based on the distances of the background sub-frame from the nearest and the farthest background sub-frames in the same background section. The luminance factor calculator 324 determines the luminance factor for each background sub-frame. In an embodiment, the luminance factor may be determined based on the dynamic threshold distance.

At operation 614, the brightness evaluator 326 determines the effective brightness value of each background section using weighted average of the luminance factor and the average brightness values of background sub-frames.

At operation 616, the enhancement mask generator 328 determines the enhancement factor for each background section based on the effective brightness value of the background section and the average of the average brightness value of each foreground sub-frame corresponding to each background sub-frame forming the background section. The enhancement mask generator 328 generates the enhancement mask for each foreground sub-frame based on the enhancement factor for the background section corresponding to the foreground sub-frame.

At operation 618, the frame interpolator 330 enhances the foreground sub-frames based on the enhancement mask.

At operation 620, the frame interpolator 330 determines the adjusted brightness values for the foreground pixels using interpolation.

At operation 622, the frame interpolator 330 adjusts the brightness of the foreground pixels based on the modified brightness values.

Figure 7:
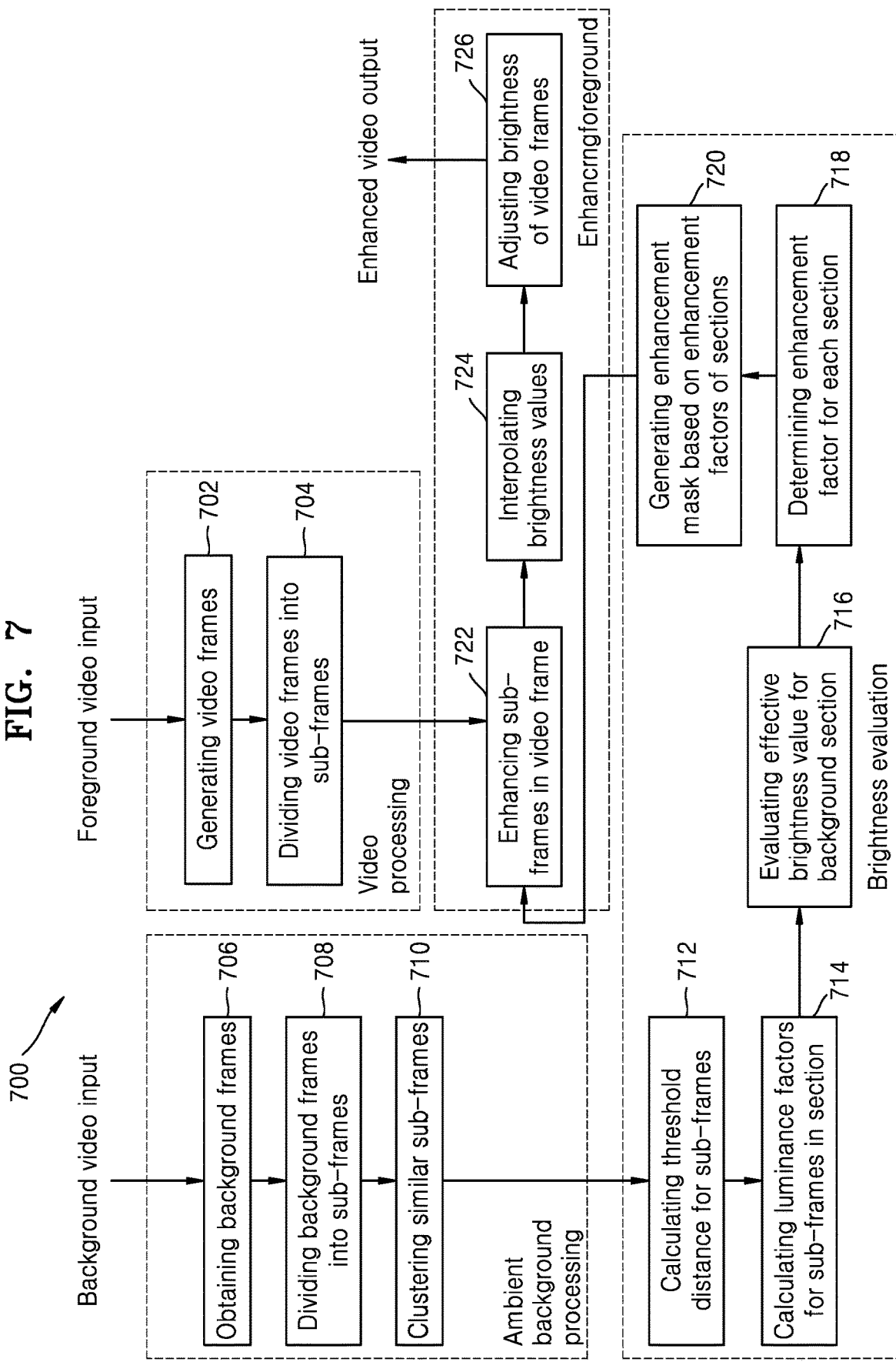
FIG. 7 shows a flowchart illustrating a brightness adjustment method according to an embodiment of the disclosure.

FIG. 7 shows a flowchart illustrating a brightness adjustment method according to an embodiment of the disclosure.

Referring to FIG. 7, a flowchart 700 illustrating a brightness adjustment method is shown in accordance with an embodiment of the disclosure.

At operation 702, the video frame generator 216 generates the foreground video frames from the foreground video.

At operation 704, the frame processor 318 divides the foreground video frame of the foreground video into the foreground sub-frames.

At operation 706, the camera 212 obtains the background frames.

At operation 708, the frame processor 318 divides the background frame of the background into the background sub-frames.

At operation 710, the clustering unit 320 clusters the similar background sub-frames for forming the background sections.

At operation 712, the threshold selector 322 calculates and determines the dynamic threshold distance for the background sub-frames.

At operation 714, the luminance factor calculator 324 calculates the luminance factors for the background sub-frames in the background section.

At operation 716, the brightness evaluator 326 evaluates the effective brightness value for the background section.

At operation 718, the enhancement mask generator 328 determines the enhancement factor for each background section.

At operation 720, the enhancement mask generator 328 generates the enhancement mask for each foreground sub-frame based on the enhancement factors of the background sections.

At operation 722, the frame interpolator 330 enhances the foreground sub-frames in the foreground video based on the enhancement masks.

At operation 724, the frame interpolator 330 interpolates the brightness values of the foreground pixels.

At operation 726, the display controller 230 adjusts the brightness values of the foreground pixels to be displayed.

Figure 8:
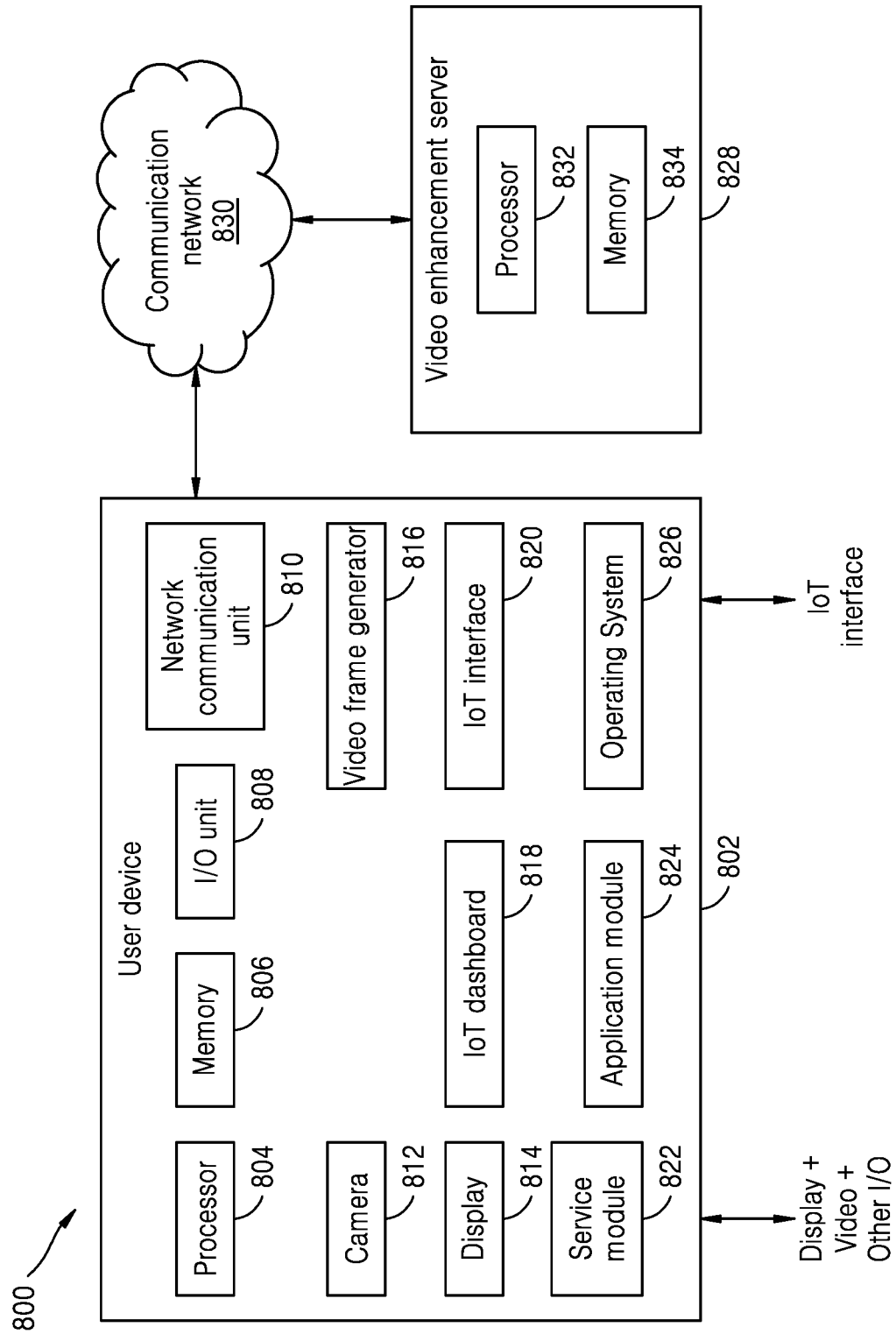
FIG. 8 illustrates a schematic block diagram of a brightness adjustment system according to an embodiment of the disclosure.

FIG. 8 illustrates a schematic block diagram of a brightness adjustment system according to an embodiment of the disclosure.

Referring to FIG. 8, a schematic block diagram of a brightness adjustment system 800 is shown in accordance with an embodiment of the disclosure. The brightness adjustment system 800 includes a user device 802. The user device 802 includes a processor 804, a memory 806, an I/O unit 808, a network communication unit 810, a camera 812, a display 814, a video frame generator 816, an IoT dashboard 818, an IoT interface 820, a service module 822, an application module 824, and an operating system 826. The user device 802 is in communication with a video enhancement server 828 by way of a communication network 830. The video enhancement server 828 includes a memory 834 and a processor 832. The network communication unit 810 and the video frame generator 816 may be combined into the processor 804 or the processor 804 may perform the same functions performed by the network communication unit 810 and the video frame generator 816.

The processor 804, the memory 806, the I/O unit 808, the network communication unit 810, the camera 812, the display 814, the video frame generator 816, the IoT dashboard 818, the IoT interface 820, the service module 822, the application module 824, and the operating system 826 are structurally and functionally similar to the processor 204, the memory 206, the I/O unit 208, the network communication unit 210, the camera 212, the display 228, the video frame generator 216, the IoT dashboard 218, the IoT interface 220, the service module 222, the application module 224, and the OS 226, respectively.

The video enhancement server 828 receives the foreground video and the background from the user device 802. The video enhancement server 828 performs the brightness enhancement method of the disclosure and provides the enhanced video to the user device 802.

The processor 832 is structurally and functionally similar to the enhancement engine 214.

Figure 9:
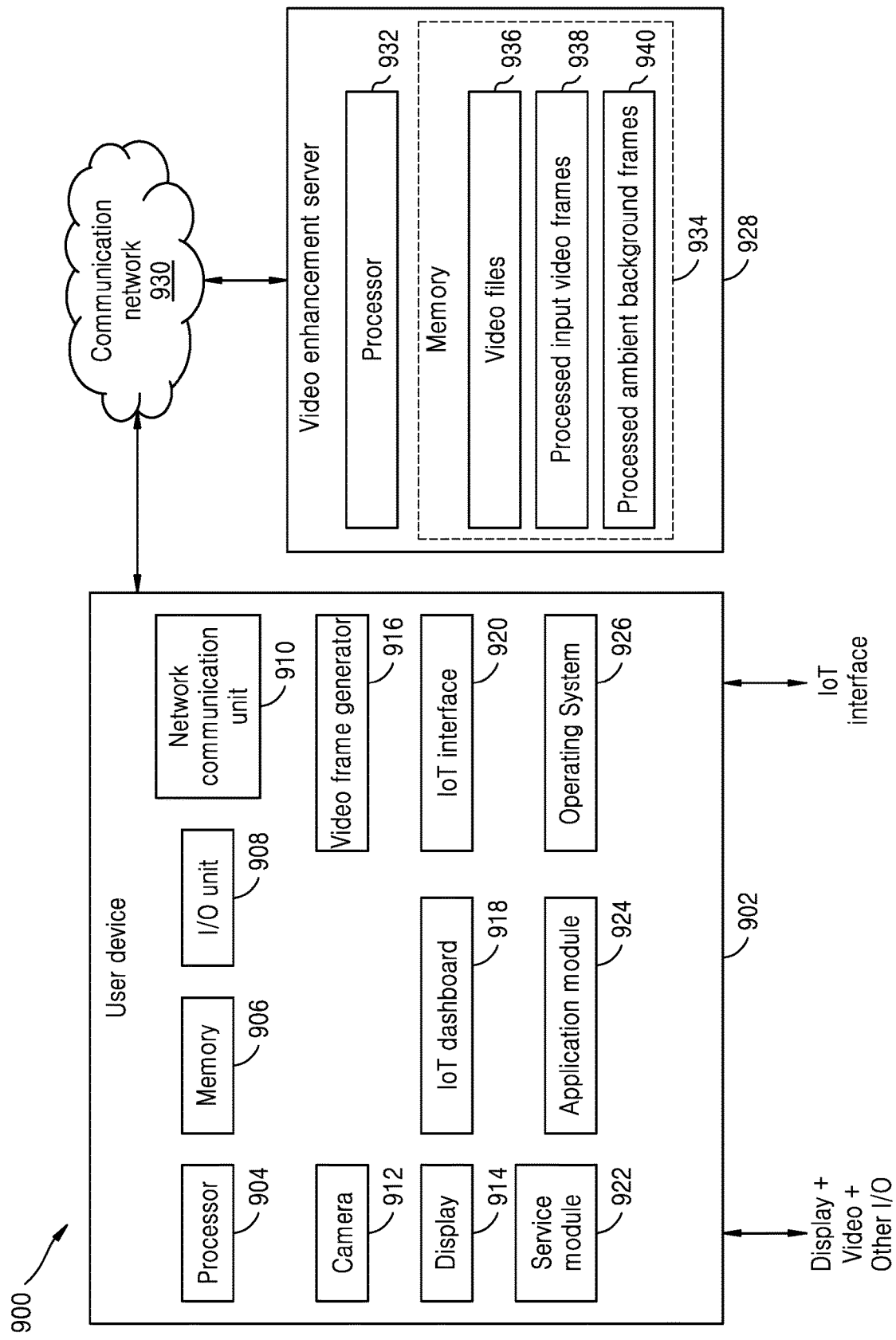
FIG. 9 illustrates a schematic block diagram of a brightness adjustment system according to an embodiment of the disclosure.

FIG. 9 illustrates a schematic block diagram of a brightness adjustment system according to an embodiment of the disclosure.

Referring to FIG. 9, a schematic block diagram of a brightness adjustment system 900 is shown in accordance with an embodiment of the disclosure. The brightness adjustment system 900 includes a user device 902. The user device 902 includes a processor 904, a memory 906, an I/O unit 908, a network communication unit 910, a camera 912, a display 914, a video frame generator 916, an IoT dashboard 918, an IoT interface 920, as service module 922, an application module 924, and an OS 926. The user device 902 is in communication with a video enhancement server 928 by way of a communication network 930. The video enhancement server 928 includes a processor 932 and a memory 934. The memory 934 includes video files 936, processed input video frames 938, and processed ambient background frames 940. The network communication unit 910 and the video frame generator 916 may be combined into the processor 904 or the processor 904 may perform the same functions performed by the network communication unit 910 and the video frame generator 916.

The processor 904, the memory 906, the I/O unit 908, the network communication unit 910, the camera 912, the display 914, the video frame generator 916, the IoT dashboard 918, the IoT interface 920, the service module 922, the application module 824, and the operating system 926 are structurally and functionally similar to the processor 204, the memory 206, the I/O unit 208, the network communication unit 210, the camera 212, the display 228, the video frame generator 216, the IoT dashboard 218, the IoT interface 220, the service module 222, the application module 224, and the OS 226, respectively.

The video enhancement server 928 receives the foreground video and the background from the user device 902. The video enhancement server 928 performs the brightness enhancement method of the disclosure and stores the enhanced video, the background, and the foreground video in the memory 934.

The processor 932 is structurally and functionally similar to the enhancement engine 214. The memory 934 is structurally and functionally similar to the memory 206.

Figure 10:
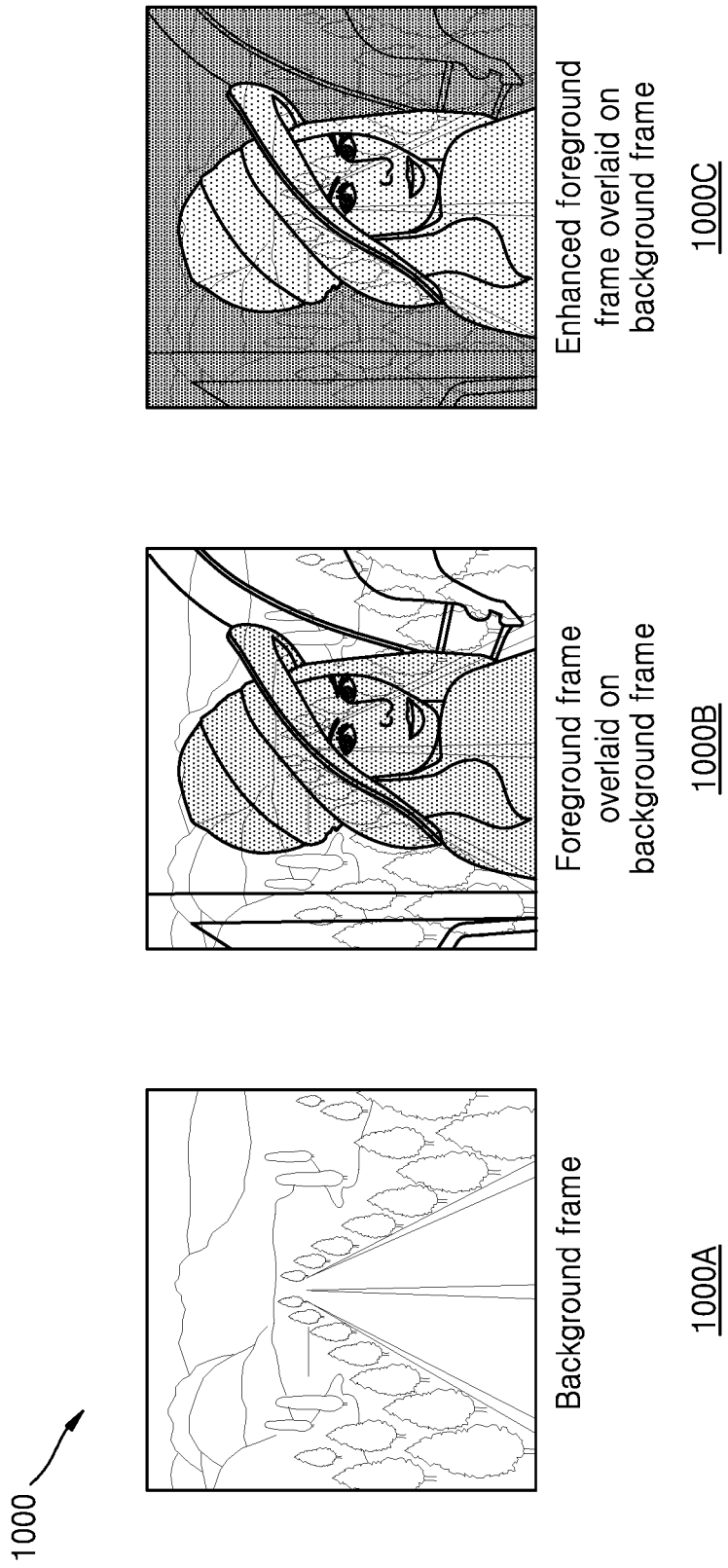
FIG. 10 illustrates a first use case of the brightness adjustment according to an embodiment of the disclosure.

FIG. 10 illustrates a first use case of the brightness adjustment according to an embodiment of the disclosure.

Referring to FIG. 10, a first use case 1000 of the brightness adjustment of the disclosure is shown.

In 1000A, a background frame having high brightness areas is shown.

In 1000B, a foreground frame overlaid on the background frame is shown.

In 1000C, a composite frame having an enhanced foreground frame overlaid on the background frame is shown.

Here, a user tries to overlay a foreground video on a sunny background in the AR display device. Due to high brightness across the sunny part in the background frame, information in that part is not clearly viewable in the foreground frame.

The disclosure detects the brightness across various sections in the background frame having the sunny part and identifies corresponding sections in the foreground frame that are being affected by the brighter sections of the sunny background frame. The disclosure enhances the brightness values of the foreground frame based on the brightness values of the corresponding background sections. Therefore, after the enhancement, details in all the sections of the foreground frame are clearly visible.

Figure 11:
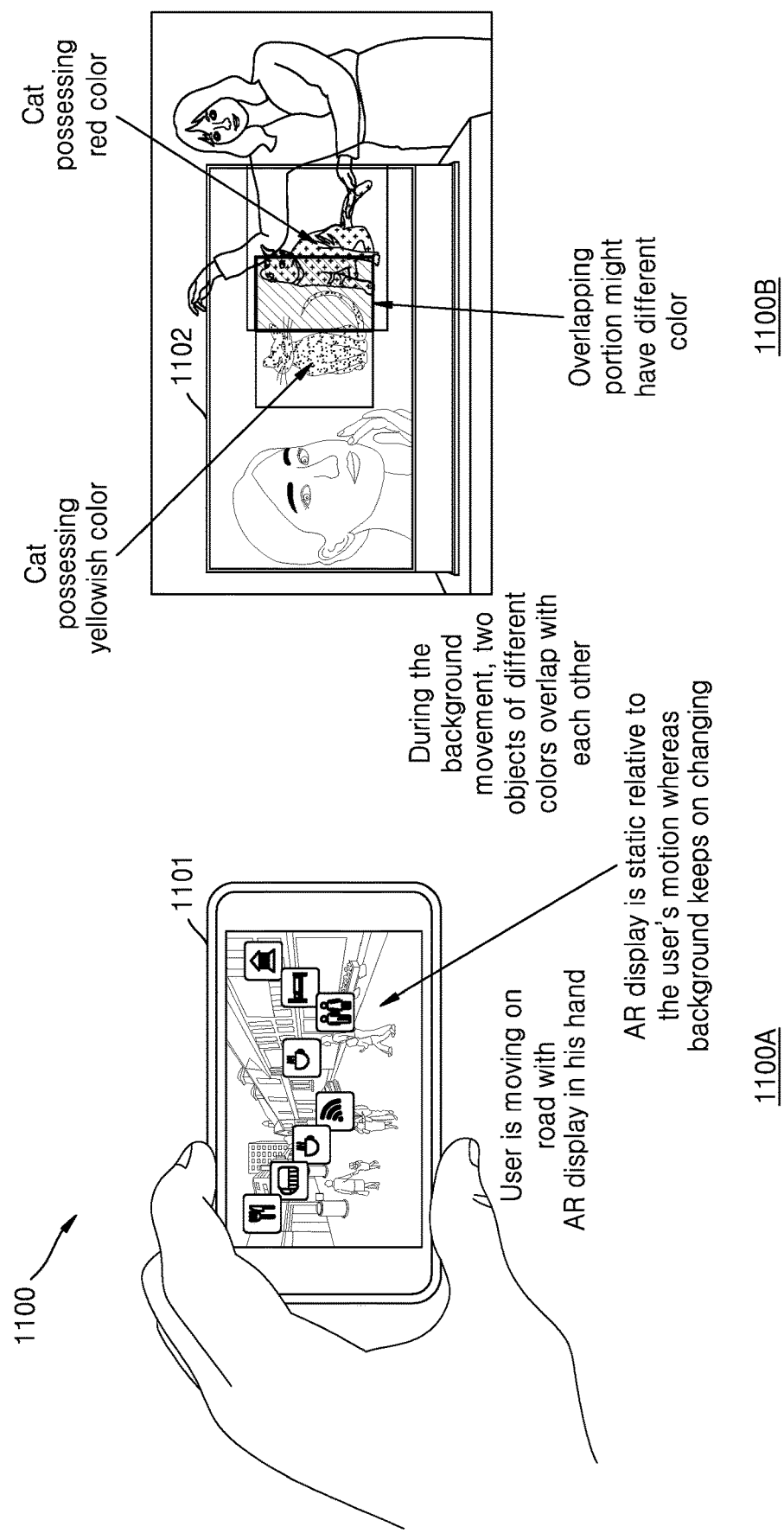
FIG. 11 illustrates a second use case of the brightness adjustment according to an embodiment of the disclosure.

FIG. 11 illustrates a second use case of the brightness adjustment according to an embodiment of the disclosure.

Referring to FIG. 11, a second use case 1100 of the brightness adjustment of the disclosure is shown.

In 1100A, a user moves on a road with an AR device 1101 showing a background. A display on the AR device 1101 is static relative to the user's movement whereas objects in the background change in real-time.

Here, the processor of the AR device 1101 may evaluate brightness and enhance content displayed on the AR device 1101 based on the movement of the objects in the background.

In 1100B, when two objects of different colors are overlapped on a display on an AR device 1102, an overlapped portion is highlighted in a different color.

Here, the processor of the AR device 1102 may evaluate the brightness of the overlapping section. A foreground display affected by the overlapping section is enhanced based on brightness of the overlapping section.

Figure 12A:
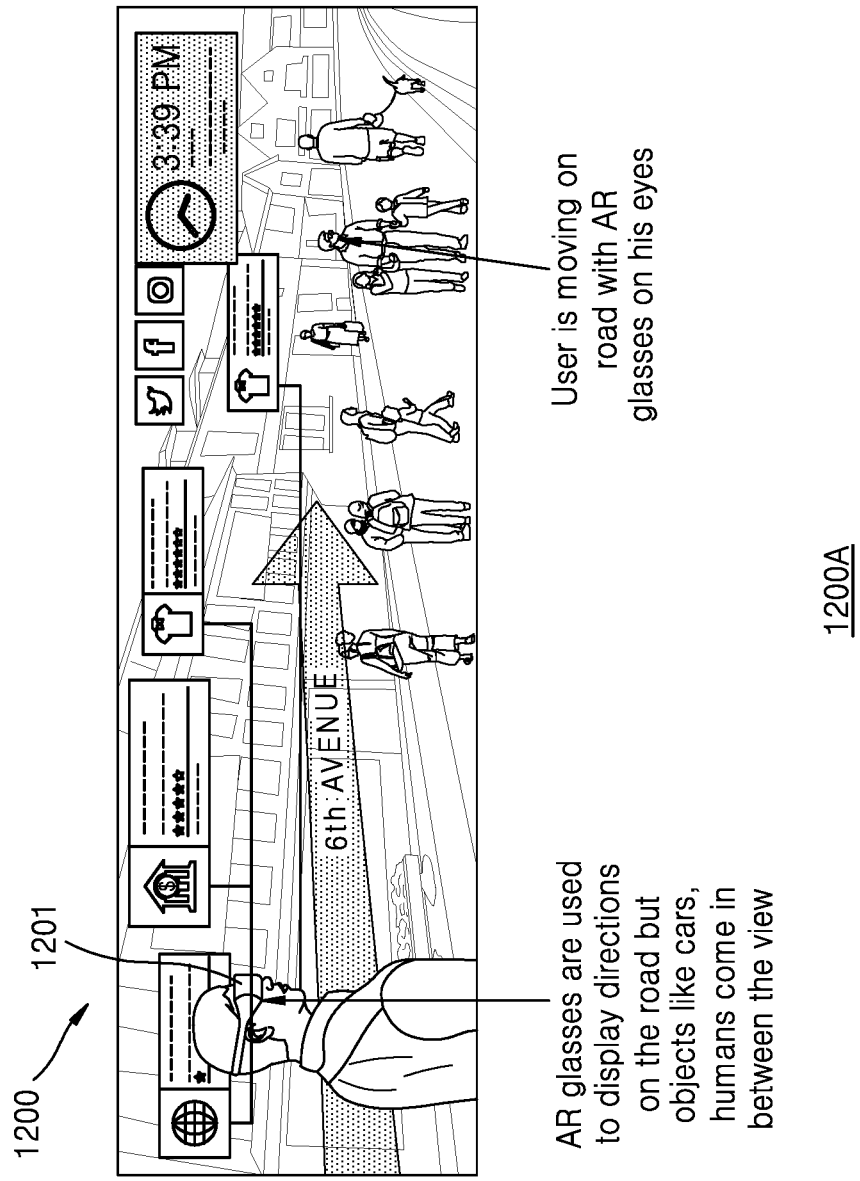
FIG. 12A illustrates a third use case of the brightness adjustment according to an embodiment of the disclosure.

FIG. 12A illustrates a third use case of the brightness adjustment according to an embodiment of the disclosure.

Referring to FIG. 12A, a third use case 1200 of the brightness adjustment of the disclosure is shown.

In 1200A, a user uses AR smart glasses 1201 showing a background superimposed with pertinent information in real-time. The user is moving on a road with AR glasses worn on his/her eyes. The information is a direction to a destination which the user wants to reach. While moving on the road, objects such as people and cars with varying colors producing brightness brighter than the information disturbs the display of the information and the user is not able to view the directions properly in the AR smart glasses 1201. The processor of the AR smart glasses 1201 may control to increase the brightness of the information based on the brightness of the moving objects in the background so that the brightness of the information representing the directions is not superseded by the brightness of the background objects.

Figure 12B:
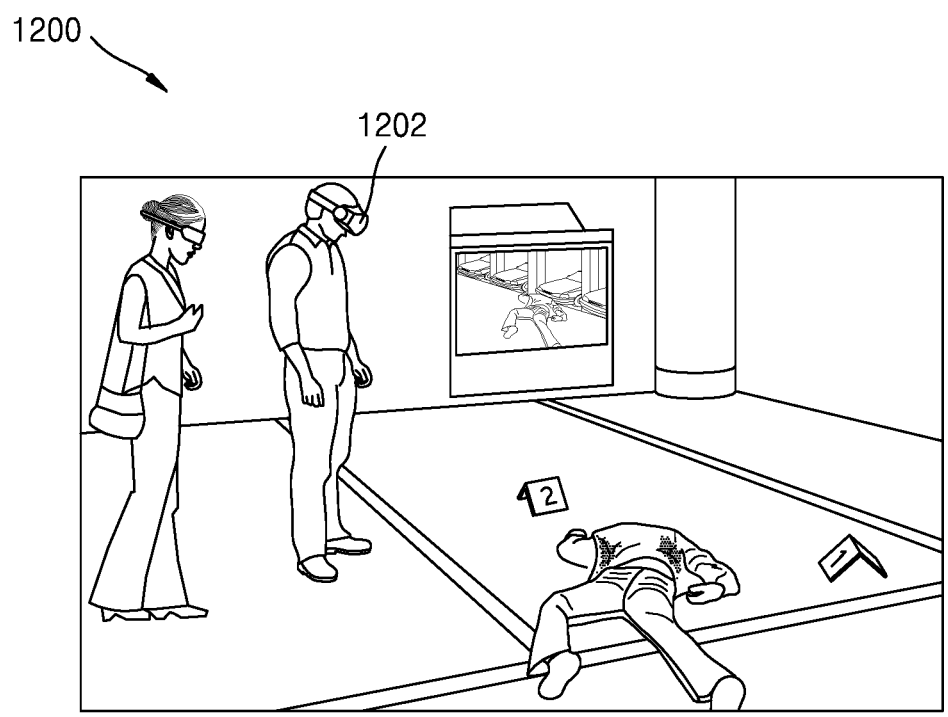
FIG. 12B illustrates a fourth use case of the brightness adjustment according to an embodiment of the disclosure.

FIG. 12B illustrates a fourth use case of the brightness adjustment according to an embodiment of the disclosure.

Referring to 1200B, during investigation of a crime scene, AR smart glasses 1202 are worn by a user to capture exact details of evidence obtained at the crime scene. While approaching the evidence through the AR smart glass 1202, details of features must be viewed in more detailed and brightened manner as brightness of evidence might create more impact on the AR smart glasses 1202. The processor of the AR smart glasses 1202 may provide better viewing of the details of the features or the evidence of the crime scene when they are brought close to the AR smart glasses 1202.

Figure 13:
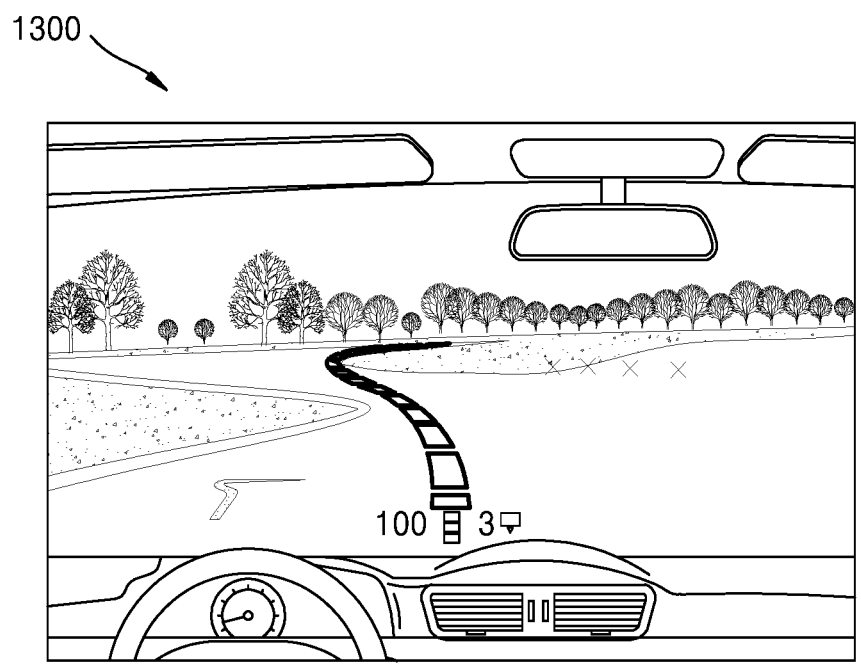
FIG. 13 illustrates a fifth use case of the brightness adjustment according to an embodiment of the disclosure.

FIG. 13 illustrates a fifth use case of the brightness adjustment according to an embodiment of the disclosure.

Referring to FIG. 13, a fifth use case 1300 of the brightness adjustment of the disclosure is shown.

Here, a windshield of a car is used as an AR device for showing directions. During movement of the car, if an object comes in a way which could affect brightness of a virtual content displayed on the windshield, then the processor in the vehicle may enhance the brightness of the displayed virtual content such that the virtual content which on the windshield is clearly visible.

Advantageously, the brightness adjustment method of the disclosure provides precise view of foreground video to a user based on different ambient background conditions. The disclosure improves streaming experiences in AR displays and provides a better user experience. The disclosure provides clear virtual details in any kind of background condition.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user device for adjusting brightness of a foreground video displayed over a background on a display, the user device comprising:
a camera configured to capture a background frame of the background;
at least one processor configured to:
receive and process the foreground video and the background,
divide the background frame of the background into a plurality of background sub-frames and a foreground video frame of the foreground video into a plurality of foreground sub-frames,
determine an average brightness value of each foreground sub-frame of the plurality of foreground sub-frames and an average brightness value of each background sub-frame of the plurality of background sub-frames,
cluster similar background sub-frames to form a plurality of background sections based on the average brightness value of each background sub-frame,
determine a luminance factor for each background sub-frame of the plurality of background sub-frames,
determine an effective brightness value for each background section of the plurality of background sections based on the luminance factor and the average brightness value of each background sub-frame forming the background section,
determine an enhancement factor for each background section of the plurality of background sections based on the effective brightness value of the background section and an average of the average brightness value of each foreground sub-frame corresponding to each background sub-frame forming the background section,
generate an enhancement mask for each foreground sub-frame of the plurality of foreground sub-frames based on the enhancement factor for the background section corresponding to the foreground sub-frame, and
adjust the average brightness value of each foreground sub-frame of the plurality of foreground sub-frames based on the corresponding enhancement mask to generate an enhanced foreground video frame; and
a display that displays the enhanced foreground video frame over the background on the display of the user device.

2. The user device of claim 1, wherein the at least one processor is further configured to identify the similar background sub-frames based on the average brightness values of the background sub-frames and a location of each background sub-frame within the background frame.

3. The user device of claim 2, wherein the at least one processor is further configured to use at least one of artificial intelligence based heuristic techniques or deep learning based image segmentation to identify the similar background sub-frames.

4. The user device of claim 1, further comprising a memory that stores the background, the foreground video, and the enhanced foreground video frames.

5. The user device of claim 1, wherein the at least one processor is further configured to determine a dynamic threshold distance for each background sub-frame based on distances of the background sub-frame from nearest and farthest background sub-frames in the same background section of the plurality of background sections, and determine the luminance factor based on the dynamic threshold distance.

6. The user device of claim 5, wherein the at least one processor is further configured to:
determine a distance $D_i^F$ between the background sub-frame i and the farthest background sub-frame in the same background section,
determine a distance $D_i^C$ between the background sub-frame i and the nearest background sub-frame in the same background section, determine the dynamic threshold distance Ti for the background sub-frame, the dynamic threshold distance Ti being an average of the distances $D_i^F$ and $D_i^C$:

$$Ti = \frac{D_i^F + D_i^C}{2},$$

determine a number of background sub-frames of the same background section within the dynamic threshold distance Ti from the background sub-frame i as the luminance factor $w_i$ for the background sub-frame i.

7. The user device of claim 1,
wherein an effective brightness value $WC_{section}$ for a background section is determined as follows:

$$WC_{section} = \sum_{i=1}^{n} \frac{x_i * w_i}{w_i} = \frac{x_1 * w_1 + x_2 * w_2 + \ldots + x_n * w_n}{w_1 + w_2 + \ldots + w_n},$$

where:
n is a total number of background sub-frames in the background section,
$x_i$ is an average brightness value of a background sub-frame i, and
$w_i$ is a luminance factor of the background sub-frame i.

8. The user device of claim 1, wherein the enhancement factor for a background section $EF_{section}$ is determined as follows:

$$EF_{section} = \frac{WC_{section}}{\text{Average of average brightness value of each foreground sub-frame corresponding to each background sub-frame in the background section.}}$$

9. The user device of claim 1, wherein the at least one processor is further configured to generate the adjusted brightness value of each foreground sub-frame of the plurality of foreground sub-frames based on the average brightness value of each foreground sub-frame of the plurality of foreground sub-frames and the enhancement factor of the corresponding background section in the enhancement mask for the foreground sub-frame.

10. The user device of claim 9, wherein the at least processor is further configured to interpolate the adjusted brightness value of each foreground sub-frame of the plurality of foreground sub-frames to obtain interpolated brightness values for each foreground pixel of a plurality of foreground pixels in the foreground sub-frame.

11. The user device of claim 10,
wherein the at least one processor is configured to adjust a V value of each foreground pixel of the plurality of foreground pixels, and
wherein the foreground pixel is represented in a Hue-Saturation-Value (HSV) format.

12. The user device of claim 1, wherein the user device is an Augmented Reality (AR) device configured to display foreground video superimposed over the background to a user of the user device.

13. The user device of claim 1, wherein the foreground video is translucent.

14. The user device of claim 1, wherein the background is a live stream of a user environment obtained by the user device in real-time.

15. A method of adjusting brightness of a foreground video displayed over a background on a display of a user device, the method comprising:
capturing, by a camera, a background frame of the background;
dividing, by at least one processor, the background frame of the background into a plurality of background sub-frames and a foreground video frame of the foreground video into a plurality of foreground sub-frames;
determining an average brightness value of each foreground sub-frame of the plurality of foreground sub-frames and an average brightness value of each background sub-frame of the plurality of background sub-frames;
clustering similar background sub-frames for forming a plurality of background sections based on the average brightness value of each background sub-frame;
determining a luminance factor for each background sub-frame of the plurality of background sub-frames;
determining an effective brightness value for each background section of the plurality of background sections based on the luminance factor and the average brightness value of each background sub-frame forming the background section;
determining an enhancement factor for each background section of the plurality of background sections based on the effective brightness value of the background section and an average of the average brightness value of each foreground sub-frame corresponding to each background sub-frame forming the background section;
generating an enhancement mask for each foreground sub-frame of the plurality of foreground sub-frames based on the enhancement factor for the background section corresponding to the foreground sub-frame;
adjusting the average brightness value of each foreground sub-frame of the plurality of foreground sub-frames based on the corresponding enhancement mask for generating an enhanced foreground video frame; and
displaying the enhanced foreground video frame over the background on the display of the user device.

16. The method of claim 15, further comprising identifying, the similar background sub-frames based on the average brightness value of each background sub-frame of the plurality of background sub-frames and a location of each background sub-frame within the background frame.

17. The method of claim 16, further comprising using at least one of artificial intelligence based heuristic techniques or deep learning based image segmentation for identifying the similar background sub-frames.

18. The method of claim 15, wherein determining the luminance factor for each background sub-frame of the plurality of background sub-frames comprises:
determining a dynamic threshold distance for each background sub-frame based on distances of the background sub-frame from nearest and farthest background sub-frames in a same background section of the plurality of background sections; and
determining the luminance factor for the background sub-frame based on the dynamic threshold distance.

19. The method of claim 18, wherein determining the luminance factor for the background sub-frame includes:
determining a distance $D_i^F$ between the background sub-frame i and the farthest background sub-frame in the same background section;
determining a distance $D_i^C$ between the background sub-frame i and the nearest background sub-frame in the same background section;
determining the dynamic threshold distance Ti for the background sub-frame i, the dynamic threshold distance Ti being an average of the distances $D_i^F$ and $D_i^C$:

$$Ti = \frac{D_i^F + D_i^C}{2};$$

and
determining a number of background sub-frames of the same background section within the dynamic threshold distance Ti from the background sub-frame i as the luminance factor $w_i$ for the background sub-frame i.

20. A video enhancement server in communication with a user device, the video enhancement server being configured to receive a foreground video and a background from the user device, the video enhancement server comprising:
a memory; and
at least one processor configured to:
divide a background frame of the background into a plurality of background sub-frames and a foreground video frame of the foreground video into a plurality of foreground sub-frames and to determine an average brightness value of each foreground sub-frame of the plurality of foreground sub-frames and an average brightness value of each background sub-frame of the plurality of background sub-frames,
cluster similar background sub-frames to form a plurality of background sections, determine a luminance factor for each background sub-frame of the plurality of background sub-frames, determine an effective brightness value for each background section of the plurality of background sections based on the luminance factor and the average brightness value of each background sub-frame forming the background section, determine an enhancement factor for each background section of the plurality of background sections based on the effective brightness value of the background section and an average of the average brightness value of each foreground sub-frame corresponding to each background sub-frame forming the background section, generate an enhancement mask for each foreground sub-frame of the plurality of foreground sub-frames based on the enhancement factor for the background section corresponding to the foreground sub-frame, and adjust the average brightness value of each foreground sub-frame of the plurality of foreground sub-frames based on the corresponding enhancement mask to generate an enhanced foreground video frame.

* * * * *